United States Patent [19]

Usui

[11] Patent Number: 4,714,830

[45] Date of Patent: Dec. 22, 1987

[54] LIGHT BEAM POSITIONER WITH SCAN DISTORTION COMPENSATION

[75] Inventor: Takeshi Usui, Tokyo, Japan

[73] Assignee: NEC Corporation, Japan

[21] Appl. No.: 854,042

[22] Filed: Apr. 21, 1986

[30] Foreign Application Priority Data

Apr. 19, 1985 [JP] Japan .................................. 60-82650

[51] Int. Cl.[4] .............................................. H01J 3/14
[52] U.S. Cl. .................... 250/234; 250/235; 350/6.6; 358/293
[58] Field of Search .................... 250/234, 235, 236; 318/632; 358/265, 288, 293; 350/6.5, 6.6

[56] References Cited

U.S. PATENT DOCUMENTS

| 4,143,403 | 3/1979 | Ohnishi | 358/293 |
| 4,314,154 | 2/1982 | Minoura et al. | 350/6.6 |
| 4,318,582 | 3/1982 | Minoura et al. | 350/6.6 |
| 4,636,870 | 1/1987 | Yamada et al. | 358/288 |

OTHER PUBLICATIONS

Alan Cable, "Solving the High Speed Laser Trimming Puzzle", Hybrid Circuit Technology, Sep. 1984 (57-61).

*Primary Examiner*—Edward P. Westin
*Assistant Examiner*—Charles Wieland
*Attorney, Agent, or Firm*—Ostrolenk, Faber, Gerb & Soffen

[57] ABSTRACT

Scan distortion is eliminated in a light beam positioner utilizing a first mirror for deflecting a light beam in a first direction in response to a first compensated control signal. A second mirror receives the light deflected from the first mirror and, in response to a second compensated control signal, deflects the received light beam at a second angle in a second direction which is orthogonal to the first direction. An objective lens is provided for focussing the deflected light beam produced by the second mirror. A controller means generates first and second uncompensated control signals which are respectively proportional to the first and second angles of deflection. A scan distortion compensating circuit generates first and second intermediate signals which are respectively dependent on the first and second uncompensated control signals. The compensating circuits substracts the first intermediate signal from the first uncompensated control signal to generate the first compensated control signal, and adds the second intermediate signal to the second uncompensated control signal to generate the second compensated control signal. Drive means is provided for driving the first and second beam scanning means in response to the first and second compensated control signals, respectively.

3 Claims, 5 Drawing Figures

LIGHT BEAM POSITIONER WITH SCAN DISTORTION COMPENSATION

BACKGROUND OF THE INVENTION

The present invention relates to a laser machining apparatus which uses a laser beam to, for example, trim thin film resistors and devices and, more particularly, to a beam positioner for a laser machining apparatus for moving a laser light beam.

While laser machining is generally performed by moving either a laser beam or a device to be machined, beam moving systems are predominant today due to inherently high throughput attainable therewith. A typical beam positioner is implemented with the combination of a galvanometer type optical scanner and a so called $f \times \theta$ objective lens and is particularly useful for high-speed operation. The foregoing type of system is described by Alan Cable in an article entitled "Solving the High Speed Laser Trimming Puzzle", published by Hybrid Circuit Technology, September 1984, pp. 57-61.

An optical scanner ordinarily consists of an X-axis scanner and a Y-axis scanner adapted to deflect a laser beam in the orthogonal X- and Y-axis directions, respectively, and respective drivers associated with each of the scanners. The scanners in most cases are implemented with galvanometers. The drivers respectively drive the X- and Y-axis scanners responsive to X-axis and Y-axis deflection control signals which are outputted by a control circuit of a laser machining apparatus. In this way a respective mirror mounted on each scanner is rotated by predetermined angles. A light beam is reflected by the X-axis and Y-axis mirrors and then passed through the $f \times \theta$ lens to be focused onto a workpiece. A $f \times \theta$ lens is an objective lens having such a characteristic that, assuming the focal length is f and the angle between the optical axis and an incident light beam is $\theta$, the focussing point of the beam lies in the focal plane of the lens and is spaced $f \times \theta$ from the focus of the lens. The focal point of the beam on a work surface is proportional to the deflection angle of the mirror. A galvanometer for use with this scanner is applied to various types of apparatus, especially a laser trimmer, because the mirror develops only low moments of inertia during small angular movements thereby allowing a laser beam to move at high speed.

However, a problem with the above-described prior art beam positioner is that because the light beam is sequentially deflected by two optical scanners and then passed through an $f \times \theta$ lens, its locus on a work surface is somewhat deviated from an ideal one, resulting in distortion which is usually referred to as scan distortion. Such scan distortion prevents a laser trimmer from accurately trimming microscopic patterns.

SUMMARY OF THE INVENTION

It is, therefore, an object of the present invention to provide a beam positioner which even in a high-speed and arbitrary scanning condition can constantly and automatically compensate for scan distortion, thereby allowing a light beam to scan a work along a desired locus.

In order to achieve the above object, the present invention embraces the concept of compensating X- and Y-axis deflection control signals which are applied to beam scanning means, using a scan distortion compensation circuit.

In accordance with the present invention, there is provided light beam positioner comprising first and second beam scanning means. The first beam scanning means is for deflecting a light beam at a first deflection in accordance with a first deflection control signal. The second beam scanning means is for receiving the light beam which is produced by the first beam scanning means and, in response to a second deflection control signal, deflecting the received light beam in a second direction which is orthogonal to the first direction. An $f \times \theta$ objective lens is included for focusing the light beam produced by the second beam scanning means. A scan distortion compensating means is provided for generating first and second distortion compensation signals which respectively are dependent on the first and the second control signals, subtracting the first distortion compensation signal from the first deflection control signal to generate a first output signal, and adding the second distortion compensation signal to the second deflection control signal to generate a second output signal. Finally, drive means are provided for driving the first and the second beam scanning means responsive to the first and the second output signals, respectively.

When the amplitude levels of the first and second deflection control signals respectively are $V_1$ and $V_2$, the first distortion compensation signal is $\alpha V_1 V_2^2$ and the second distortion compensation signal is $\beta V_1^2 V_2$ ($\alpha$ and $\beta$ being coefficients).

BRIEF DESCRIPTION OF THE DRAWINGS

The above and other objects, features and advantages of the present invention will become more apparent from the following detailed description taken in conjunction with the accompanying drawings in which.

DETAILED DESCRIPTION OF THE PREFERRED EMBODIMENTS

Figure 1:
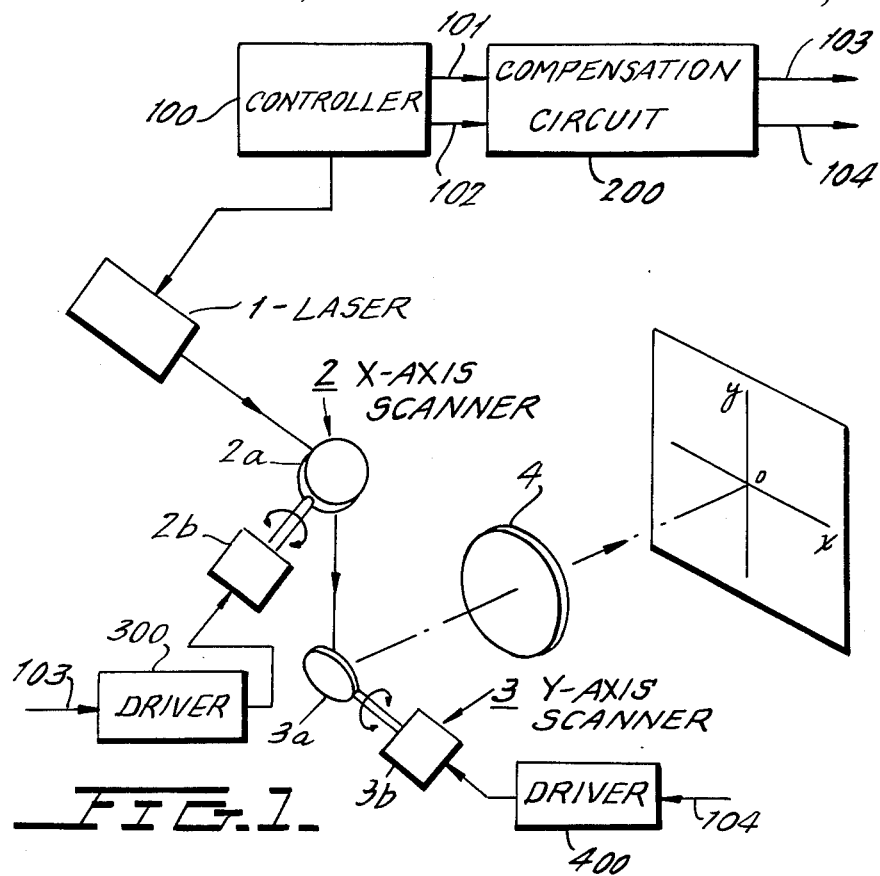
FIG. 1 is a block diagram of a light beam positioner embodying the present invention.

Referring to FIG. 1, a beam positioner embodying the present invention is shown in conjunction with a laser machining apparatus.

As shown, the beam positioner includes an X-axis galvanometer 2 made up of a mirror 2a and a mirror drive section 2b adapted to rotate the mirror 2a, a Y-axis galvanometer 3 made up of a mirror 3a and a mirror drive section 3b adapted to rotate the mirror 3a, and an $f \times \theta$ objective lens (hereinafter referred to as $f \times \theta$ lens 4 for simplicity) which serves to focus a laser beam reflected by the mirror 3a onto a workpiece, not shown. The $f \times \theta$ lens 4 is a lens whose characteristic is such that assuming that its focal length is f and the angle between its optical axis and an incident light beam is $\theta$, the focusing point of the beam lies in the focal plane of the lens and is spaced $f \times \theta$ from the focus of the lens. Assume that the lens 4 has an optical axis Z, and that an orthogonal coordinate system with an X-axis and a Y-axis is defined as illustrated. Then, a work surface is disposed in the XY plane.

A laser beam issuing from a laser 1 is sequentially reflected by the mirrors 2a and 3a of the X- and Y-axis galvanometers 2 and 3 and then passed through the f×θ lens 4 to be focused onto the surface of a workpiece. The galvanometers 2 and 3 respectively are adapted to deflect the light beam in the X- and Y-axis directions to scan the work surface. The scanning position on the work surface is proportional to a deflection angle which is determined by rotations of the mirrors 2a and 3a.

The beam positioner further includes drivers 300 and 400 adapted to drive respectively the X- and Y-axis galvanometers 2 and 3, and a controller 100 for generating an X-axis deflection control signal 101 and a Y-axis deflection control signal 102 and for controlling the output of the laser 1. The beam positioner further includes a scan distortion compensation circuit 200 for generating a compensated X-axis signal 103 and a compensated Y-axis signal 104 responsive to the X- and Y-axis deflection control signals 101 and 102, respectively. The signals 103 and 104 are routed to the drivers 300 and 400, respectively.

The driver 300 amplifies the input signal 103 and then applies it to the mirror drive section 2b of the X-axis galvanometer 2. Likewise, the driver 400 amplifies the input signal 104 and then applies it to the mirror drive section 3b of the Y-axis galvanometer 3. The mirror drive sections 2b and 3b respectively are adapted to rotate the mirrors 2a and 3a in proportion to their input currents.

Figure 2:
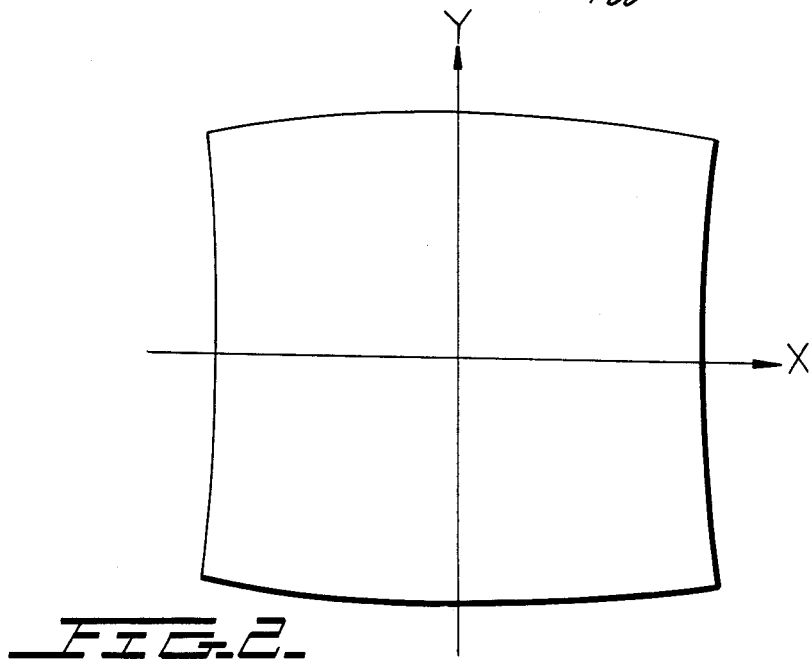
FIG. 2 shows an exemplary locus of a laser beam on a work surface which is not subjected to distortion compensation.

The output levels of the X- and Y-axis control signals 101 and 102 and the deflection angles of the mirrors 2a and 3a are proportional to each other. At the beginning, the laser beam and the X- and Y-axis scanners are optically arranged such that the laser beam focuses to the origin O when the input signals to both of the scanners are zero, and to the X-axis when the Y-axis input signal is zero and the X-axis input signal is not, and to the Y-axis when the X-axis input signal is zero and the Y-axis input signal is not. This allows the laser beam to draw any desired pattern in response to the X- and Y-axis input signals. Preferably, therefore, if the X- and the Y-axis control signals 101 and 102 are respectively applied to the drivers 300 and 400, the light beam is expected to focus to desired coordinates (x, y). However, in the arrangement of FIG. 1, should the light beam deflected by the X-axis galvanometer 2 by deflected by the Y-axis galvanometer 2, the locus of the beam on the XY plane would be somewhat enlarged in the X-axis direction; the greater the angle of Y-axis deflection, the greater the enlargement. In the Y-direction, on the other hand, the locus of the laser beam would be reduced and the reduction would increase with the angle of X-axis deflection. Further, where a light beam which is incident to the lens 4 at a position remote from the optical axis is used for linear scanning, the resultant image is deformed due to peripheral distortion particular to the lens 4 and, therefore, a linear locus cannot be provided on the work surface. In this condition, coordinates (x', y') of the actual focal point of the beam defined by the beam positioner in the XY plane is deviated from the desired coordinates (x, y). For example, when it is intended to form on a work surface a square locus of light beam whose sides are parallel to the X- and Y-axis, a locus actually provided on the work surface appears distorted as shown in FIG. 2. Such distortion may be better understood from the study of optogeometric theory. The relationship between coordinates (x, y) of a desired beam position and coordinates (x', y') of actual beam position is expressed as:

$$x' = f \cdot \frac{\sin^{-1}(T)}{T} \cdot \sin\left(\frac{x}{f}\right) \quad \text{Eq. (1)}$$

$$y' = f \cdot \frac{\sin^{-1}(T)}{T} \cdot \cos\left(\frac{x}{f}\right) \cdot \sin\left(\frac{y}{f}\right) \quad \text{Eq. (2)}$$

where f is the focal length of the objective lens and $$T = \sqrt{\sin^2\left(\frac{x}{f}\right) + \cos^2\left(\frac{x}{f}\right) \cdot \sin^2\left(\frac{y}{f}\right)}$$

The process which derived the Eqs. (1) and (2) is omitted herein. It will be noted that the Eqs. (1) and (2) apply to the arrangement of FIG. 1 wherein the laser beam issuing from the X-axis galvanometer 2 is incident to the Y-axis galvanometer 3. Where the order of propagation is reversed, x and x' in the Eqs. (1) and (2) need only be replaced with y and y', respectively.

In the Eqs. (1) and (2), if x=0, then x'=0 and y'=y and, if y=0, then x'=x and y'=0. It will therefore be seen that the locus on the X- and Y-axis is not distorted. Considering that the values of x and y are sufficiently smaller than the focal length f of the objective lens:

$$x' = x + \frac{1}{6f^2} \cdot xy^2 \quad \text{Eq. (3)}$$

$$y' = y - \frac{1}{3f^2} \cdot x^2 y \quad \text{Eq. (4)}$$

This teaches that the actual coordinates x' are not only a function of x but also of y and, likewise, the actual coordinates of y' are not only the function of y but also of x. More specifically, the coordinate x increases in the X-axis direction and has a value which increases with the coordinates y; the coordinate y reduces in the Y-axis direction and has a value which increases with the coordinates x.

In accordance with a preferred embodiment, the X-axis and Y-axis deflection control signals 101 and 102 are not directly routed to their associated drivers 300 and 400. Instead, the scan distortion compensation circuit 200 generates a compensated X-axis signal 103 and a compensated Y-axis signal 104 which depend on both the X-axis and Y-axis direction control signals. The compensated signals 103 and 104 are applied to the drivers 300 and 400, respectively. In this arrangement, the drivers 300 and 400 provide loci of light beam which respectively are proportional to the X-axis and the Y-axis deflection control signals.

Solving Eqs. (3) and (4) with respect to x and y for the condition f >> x', y' and omitting the third term and onward, we obtain:

$$x = x' - \frac{1}{6f^2} \cdot x'y'^2 \quad \text{Eq. (5)}$$

$$y = y' + \frac{1}{3f^2} \cdot x'^2 y' \quad \text{Eq. (6)}$$

Meanwhile, assuming that the voltages of the X-axis and the Y-axis deflection control signals 101 and 102 respectively are $V_1$ and $V_2$, those of the compensated X-axis and Y-axis signals respectively are $V_3$ and $V_4$, and the distance of movement of the beam focal point per unit input voltage of the drivers 300 and 400 is g, then the following equations hold:

$$x' = gV_1,$$
$$y' = gV_2$$
$$x = gV_3,$$
$$y = gV_4$$

Substituting the above equations for the Eqs. (5) and (6), we obtain:

$$V_3 = V_1 - \frac{q^2}{6f^2} \cdot V_1 V_2^2 \qquad \text{Eq. (7)}$$

$$V_4 = V_2 + \frac{q^2}{3f^2} \cdot V_1^2 V_2 \qquad \text{Eq. (8)}$$

In Eqs. (7) and (8), the second terms constitute the distortion compensating components. Subtracting and adding the respective compensating components from and to the X-axis and the Y-axis deflection control signal voltages $V_1$ and $V_2$, there are obtained the compensated X-axis and the compensated Y-axis signal voltages $V_3$ and $V_4$. Thus, the distortion compensation circuit applicable to the present invention generates output signals which satisfy Eqs. (7) and (8) responsive to the input signals $V_1$ and $V_2$.

Figure 3:
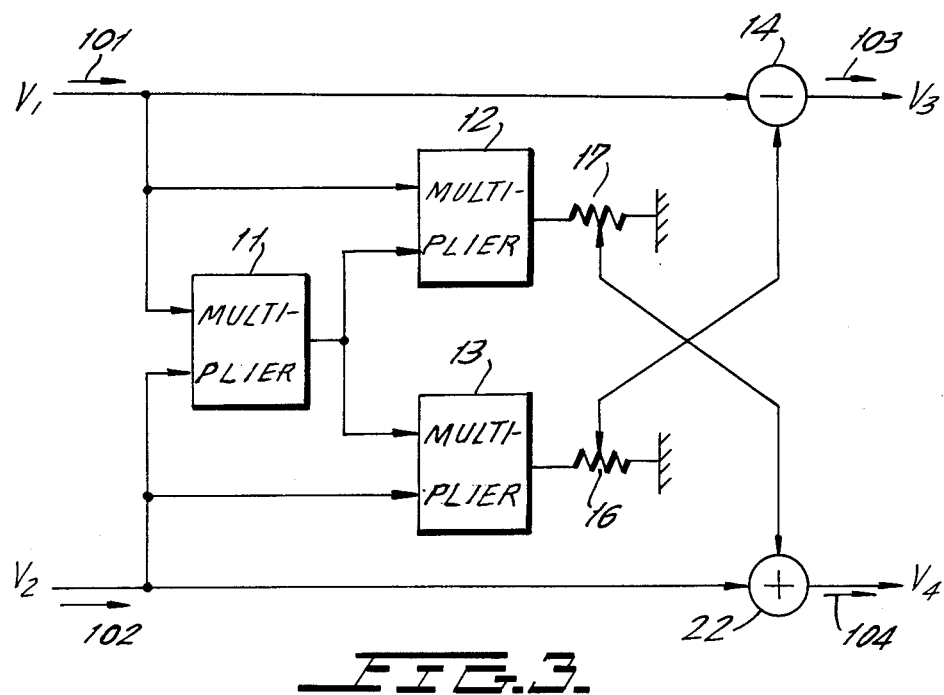
FIGS. 3 to 5 are block diagrams showing scan distortion compensation circuits in accordance with various embodiments of the present invention.

Referring to FIG. 3, the scan distortion compensation circuit 200 includes analog multipliers 11 to 13, a subtractor 14, an adder 22, and variable resistors 16 and 17. Assuming that the multipliers 11 to 13 respectively are $k_1$ to $k_3$, the output voltages $P_1$ to $P_3$ of the multipliers 11 to 13 are expressed as:
$P_1$: $k_1 V_1 V_2$
$P_2$: $k_1 k_2 V_1^2 V_2$
$P_3$: $k_1 k_3 V_1 V_2^2$
Hence, the voltage $V_3$ of the output signal 103 of the subtractor 14 and the voltage $V_4$ of the output signal 104 of the adder 15 are expressed by:

$$V_3 = V_1 - ak_1 k_3 V_1 V_2^2 \qquad \text{Eq. (9)}$$

$$V_4 = V_2 + bk_1 k_2 V_1^2 V_2 \qquad \text{Eq. (10)}$$

where a and b are the distributed constants which are determined by the variable resistors 16 and 17, respectively.

In order that the output signals represented by Eqs. (9) and (10;1 ) may respectively be the outputs which are represented by the Eqs. (7) and (8), there have to be satisfied:

$$a k_1 k_3 = \frac{q^2}{6f^2}$$

$$b k_1 k_2 = \frac{q^2}{3f^2}$$

By adjusting the distributed constants a and b by the variable resistors 16 and 17, it is possible to compensate for optical scan distortion by means of an electric circuit and, therefore, provide a beam positioner which is free from scan distortion in practical use.

The analog multipliers may be implemented with, for example, analog operation units which utilize the logarithmic characteristic of a P-N junction, while the subtractor and the adder may each be implemented with an operational amplifier. The whole scan distortion compensation circuit, therefore, can readily be constructed using commercially available parts and elements.

Figure 4:
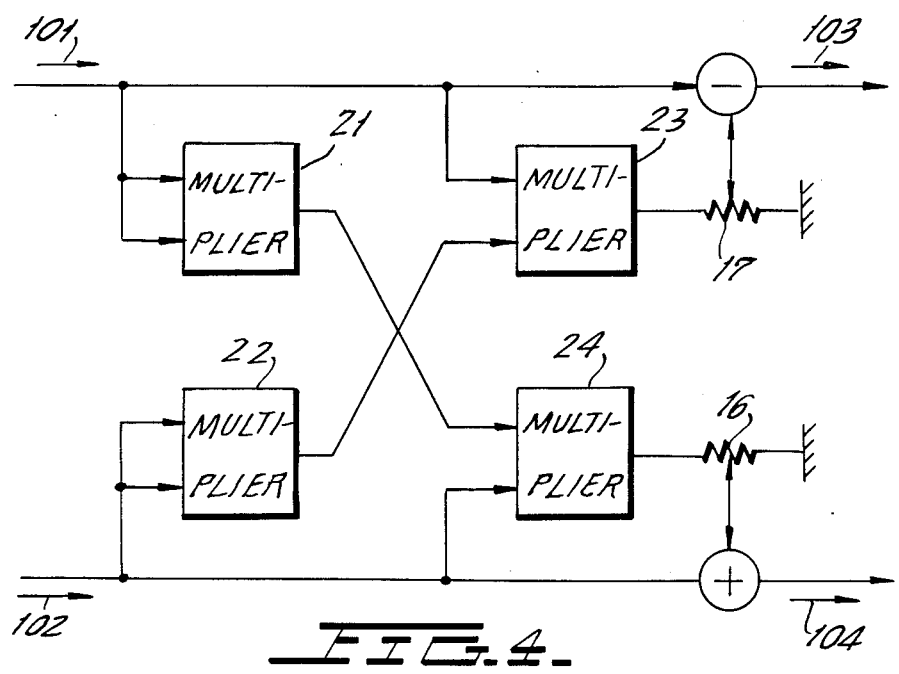

Referring to FIG. 4, another specific construction of the distortion compensation circuit applicable to the present invention is shown. This circuit includes four multipliers 21 to 24 and produces the same compensated X-axis and Y-axis signals 103 and 104 as those of FIG. 3. Assuming that the multipliers 21 and 22 have a multiplication coefficient $k_1$ and the multipliers 23 and 24 have respectively multiplication coefficients $k_3$ and $k_2$, the output voltages $Q_1$ and $Q_4$ of the multipliers 22 to 24 are expressed as:
$Q_1$: $k_1 V_1^2$
$Q_2$: $k_2 V_2^2$
$Q_3$: $k_1 k_2 V_1 V_2^2$
$Q_4$: $k_1 k_3 V_1^2 V_2$
Therefore, assuming that the amounts of attenuation effected by the variable resistors 16 and 17 respectively are a and b, the output voltage $V_3$ of the subtractor 14 and the output voltage $V_4$ of the adder 22 are the same as the previously stated Eqs. (9) and (10), respectively.

Figure 5:
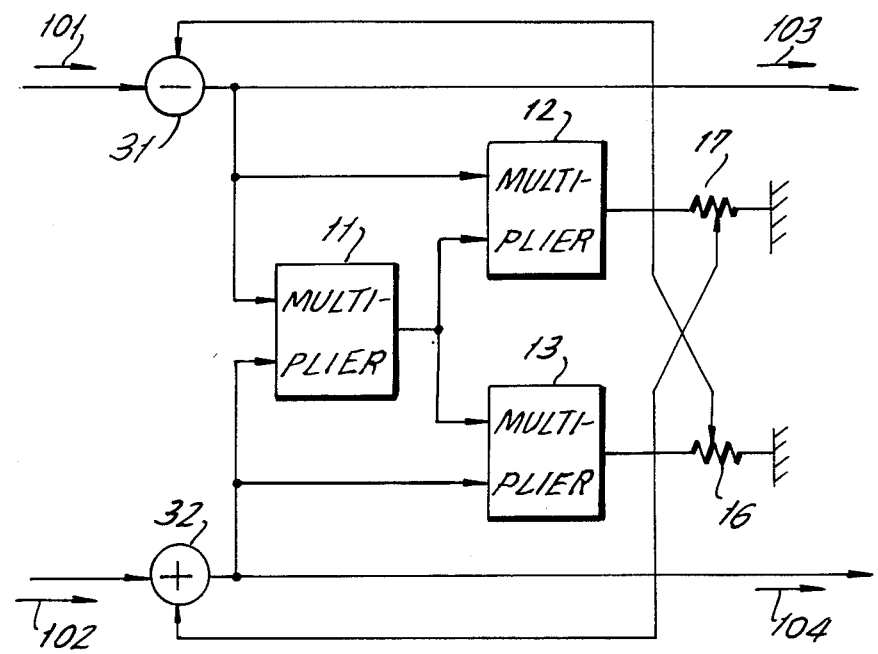

Referring to FIG. 5, another specific construction of the distortion compensation circuit is shown. As shown, a subtractor 31 and an adder 32 respectively are connected in place of the subtractor 14 and the adder 22 of FIG. 3. The output of the subtractor 31 is fed to the multipliers 11 and 12 and that of the adder 32 to the multipliers 11 and 13.

In the construction shown in FIG. 5, because the outputs of the multipliers 12 and 13 respectively are fed back to the adder 32 and the subtractor 31 after being attenuated by the variable resistors 17 and 16, the output voltages of the subtractor and adder 32 include even higher-order items than Eqs. (9) and (10). However, inasmuch as the signals initially fed back are weak, the high-order items sequentially become smaller than in value as the multiplication and the attenuation by the variable resistors are repeated; the voltages at the outputs 103 and 104 are eventually approximated by Eqs. (9) and (10).

In summary, it will be seen that the present invention provides a beam positioner capable of accurately moving a laser beam to a desired position by compensating for scan distortion which is particular to a beam positioner of the type using a galvanometer type optical scanner. The compensation is carried out by means of electrical means which uses analog multipliers. Because the distortion compensation circuit has a high-speed response capability, it does not effect high-speed movement, which is particular to an optical scanner, and thereby extends the utility of this type of beam positioner.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

I claim:

1. A light beam positioner, comprising:

first beam scanning means for deflecting a light beam at a first angle in a first direction in response to a first compensated control signal;

second beam scanning means for receiving the light beam which is produced by said first beam scanning means and, in response to a second compensated control signal, for deflecting the received light beam at a second angle in a second direction which is orthogonal to the first direction;

an objective lens for focusing the light beam produced by said second beam scanning means;

controller means for generating first and second uncompensated control signals which are respectively proportional to the first and second angles;

scan distortion compensating means for generating first and second intermediate signals which are dependent on the first and second uncompensated control signals, subtracting the first intermediate signal from the first uncompensated control signal to generate the first compensated control signal, and adding the second intermediate signal to the second uncompensated control signal to generate the second compensated control signal; and drive means for driving the first and second beam scanning means responsive to the first and the second compensated control signals, respectively.

2. A light beam positioner as claimed in claim 1, wherein the scan distortion compensation means comprises:

multiplying means made up of at least three analog multipliers for generating $\alpha V_1 V_2^2$ as the first intermediate signal and $\beta V_1^2 V_2$ as the second intermediate signal where $\alpha$ and $\beta$ are constants and the amplitude levels of the first and second uncompensated controls signals respectively are $V_1$ and $V_2$;

means for subtracting the first intermediate signal from the first uncompensated control signal to apply as the first compensated control signal thereof to the drive means; and means for adding the second intermediate signal to the second uncompensated control signal to apply as the second compensated control signal to the drive means.

3. A light beam positioner as claimed in claim 1, wherein the objective lens has a focussing point for a light beam passing therethrough situated in the focal plane of the lens and spaced by $f \times \theta$ from the focus of the lens where f is the focal length of the lens and $\theta$ is the angle between the optical axis of the lens and the light beam.

* * * * *